United States Patent
Kent

(10) Patent No.: US 8,543,900 B1
(45) Date of Patent: Sep. 24, 2013

(54) WEB PAGE ASSOCIATED WITH A NODE IN A WEBSITE TRAFFIC PATTERN

(75) Inventor: James Kent, London (GB)

(73) Assignee: Google Inc., Mountain View, CA (US)

( * ) Notice: Subject to any disclaimer, the term of this patent is extended or adjusted under 35 U.S.C. 154(b) by 50 days.

(21) Appl. No.: 13/348,553

(22) Filed: Jan. 11, 2012

(51) Int. Cl.
*G06F 17/00* (2006.01)

(52) U.S. Cl.
USPC ......... 715/205; 715/206; 705/7.11; 705/7.12; 705/7.22; 705/7.26; 705/7.27; 705/14.43; 705/14.45; 705/14.6; 709/223; 709/224; 709/225; 709/226; 717/124

(58) Field of Classification Search
USPC .............. 715/205, 206; 705/7.11, 7.12, 7.22, 705/7.26, 7.27, 14.43, 14.45, 14.6; 709/223–226; 717/124
See application file for complete search history.

(56) References Cited

U.S. PATENT DOCUMENTS

| | | | |
|---|---|---|---|
| 6,393,479 B1 * | 5/2002 | Glommen et al. | 709/224 |
| 7,096,200 B2 * | 8/2006 | Wang et al. | 705/50 |
| 7,593,935 B2 * | 9/2009 | Sullivan | 1/1 |
| 8,234,582 B1 * | 7/2012 | Haynes et al. | 715/764 |
| 2003/0130982 A1 * | 7/2003 | Kasriel et al. | 707/1 |
| 2003/0131106 A1 * | 7/2003 | Kasriel | 709/225 |
| 2004/0093327 A1 * | 5/2004 | Anderson et al. | 707/3 |
| 2007/0106641 A1 * | 5/2007 | Chi et al. | 707/3 |
| 2007/0106758 A1 * | 5/2007 | Chi et al. | 709/219 |
| 2010/0057558 A1 * | 3/2010 | Yano | 705/14.45 |
| 2012/0158952 A1 * | 6/2012 | Seifert et al. | 709/224 |

* cited by examiner

*Primary Examiner* — Doug Hutton, Jr.
*Assistant Examiner* — Andrew Dyer
(74) *Attorney, Agent, or Firm* — Foley and Lardner LLP; John D. Lanza

(57) ABSTRACT

A method of improving a traffic pattern through web page nodes of a website is provided, including selecting web page nodes. The traffic pattern includes a sequence of nodes. Each node represents a first page having a link to a second page in a subsequent node. A visitor to a node prior to a conversion node either navigates to a subsequent node or fails to progress to a subsequent node. The method also includes, for each web page, identifying display elements on the web page node that are associated with a decreased probability that the user progresses through the traffic pattern to a subsequent web page node in the predetermined traffic pattern, determining a metric representing an impact on a conversion attributable to the display elements, ranking the plurality of web page nodes based on the metrics for each web page node.

21 Claims, 8 Drawing Sheets

WEB PAGE ASSOCIATED WITH A NODE IN A WEBSITE TRAFFIC PATTERN

BACKGROUND

The present disclosure relates generally to improving a website. The present disclosure more specifically relates to improving a web page associated with a node in a traffic pattern through nodes in a website by increasing the probability that a visitor to a node in the traffic pattern progresses to a subsequent node in the traffic pattern, preferably toward a conversion event.

A traffic pattern associated with a website includes nodes. Each node is associated with a web page, and a visitor to a web page associated with one node may navigate to another node in the traffic pattern by interacting with interactive elements on the web page. The interactive elements may be, for example, buttons or forms, which the user interacts with by taking some action, such as clicking on the button with a mouse cursor or entering text into the form. Interacting with such elements may result in a conversion, meaning that the user reaches a goal node of the traffic pattern, such as completing a purchase or signing up for a mailing list. The user also may interact with elements that take the user away from the goals of the web page, such as by navigating to another web page outside of the desired traffic pattern or flow by clicking on an advertisement or other link.

SUMMARY

Implementations of the systems and methods for improving a web page associated with a node in a traffic pattern are described herein. One implementation is a method of improving a traffic pattern through web page nodes of a website is provided. The method includes selecting a plurality of web page nodes of the traffic pattern. The traffic pattern includes a predetermined sequence of web page nodes. Each web page node represents at least a first web page having a link to a second web page in a subsequent node of the traffic pattern. A visitor to a web page at any node in the traffic pattern prior to a conversion node either progresses through the traffic pattern by navigating to a subsequent web page node in the traffic pattern or fails to progress through the traffic pattern to a subsequent web page node in the traffic pattern. The method also includes, for each web page, identifying display elements on the web page node that are associated with a decreased probability that the user progresses through the traffic pattern to a subsequent web page node in the predetermined traffic pattern, determining a metric representing an impact on a conversion attributable to the display elements, ranking the plurality of web page nodes based on the metrics for each web page node and storing information about the ranking.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
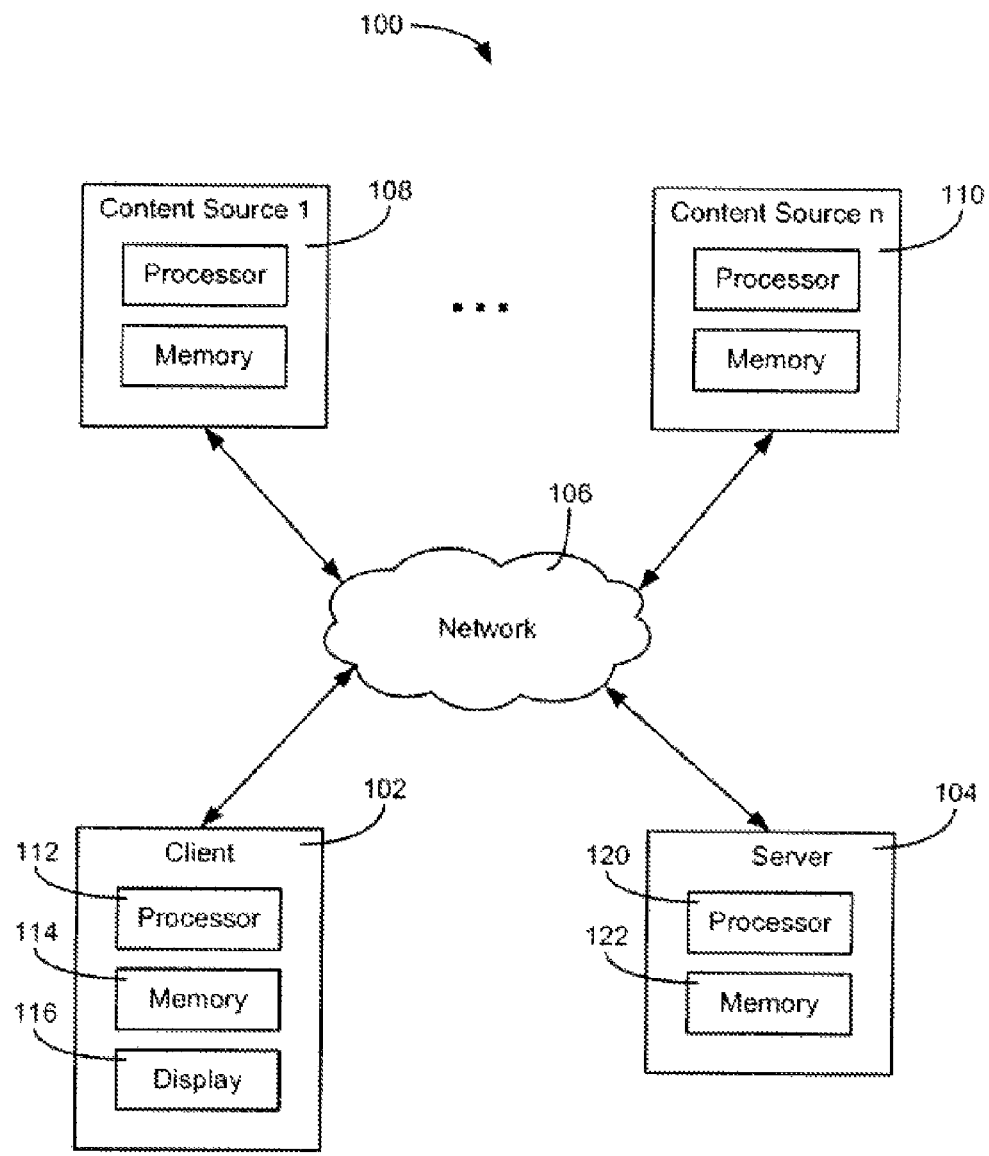
FIG. 1 is a block diagram of a computer system in accordance with a described implementation.

Referring to FIG. 1, a block diagram of a computer system 100 in accordance with a described implementation is shown. System 100 includes a client 102 which communicates with other computing devices via a network 106. For example, client 102 may communicate with one or more content sources ranging from a first content source 108 up to an nth content source 110. Content sources 108, 110 may provide webpages and/or media content (e.g., audio, video, and other forms of digital content) to client 102. System 100 may also include an analytics server 104, which may performs analytics on the webpages provided by content sources 1-$n$ and also may provide content to be included in the webpages over network 106.

Network 106 may be any form of computer network that relays information between client 102, advertisement server 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108, 110 and/or from advertisement server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, webpage data, a movie, a sound file, pictures, and other forms of data. Similarly, analytics server 104 may include a processing circuit including a processor 120 and a memory 122. In some implementations, analytics server 104 may include several computing devices (e.g., a data center, a network of servers, etc.). In such a case, the various devices of analytics server 104 may be in electronic communication, thereby also forming a processing circuit (e.g., processor 120 includes the collective processors of the devices and memory 122 includes the collective memories of the devices).

Analytics server 104 may provide content to client 102 via network 106. For example, content source 108 may provide a webpage to client 102, in response to receiving a request for a webpage from client 102. In some implementations, content from analytics server 104 may be provided to client 102 indirectly. For example, content source 108 may receive content from analytics server 104 and use the content as part of the webpage data provided to client 102. In other implementations, content from analytics server 104 may be provided to client 102 directly. For example, content source 108 may provide webpage data to client 102 that includes a command to retrieve content from analytics server 104. On receipt of the webpage data, client 102 may retrieve content from analytics server 104 based on the command and display the content when the webpage is rendered on display 116.

Figure 2:
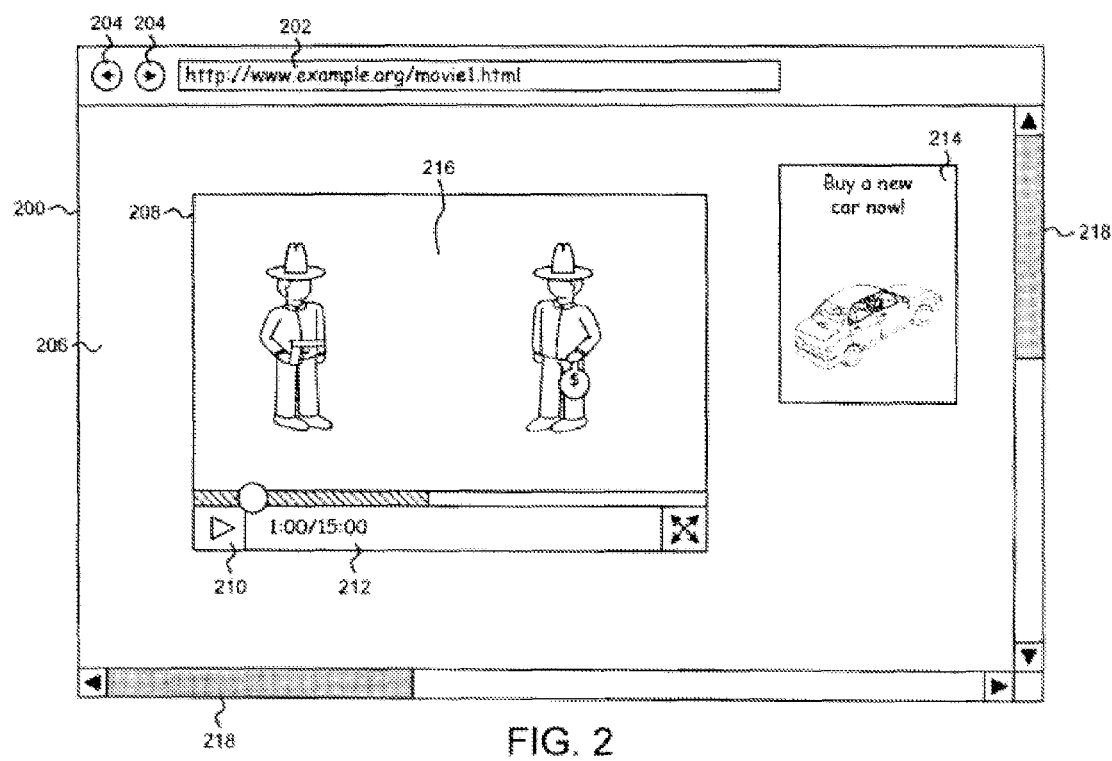
FIG. 2 is a diagram of a web page in accordance with a described implementation.

As shown in FIG. 2, the one or more processors in communication with display 200 may execute a web browser application (e.g., display 200 is part of a client device). The web browser application operates by receiving input of a uniform resource locator (URL) into a field 202, such as a web address, from an input device (e.g., a pointing device, a keyboard, a touchscreen, or another form of input device). In response, one or more processors executing the web browser may request data from a content source corresponding to the URL via a network (e.g., the Internet, an intranet, or the like). The content source may then provide webpage data and/or other data to the client device, which causes visual indicia to be displayed by display 200.

In general, webpage data may include text, hyperlinks, layout information, and other data that is used to provide the framework for the visual layout of displayed webpage 206. In some implementations, webpage data may be one or more files of webpage code written in a markup language, such as the hypertext markup language (HTML), extensible HTML (XHTML), extensible markup language (XML), or any other markup language. For example, the webpage data in FIG. 2 may include a file, "movie1.html" provided by the website, "www.example.org." The webpage data may include data that specifies where indicia appear on webpage 206, such as movie 216 or other visual objects. In some implementations, the webpage data may also include additional URL information used by the client device to retrieve additional indicia displayed on webpage 206. For example, the file, "movie1.html," may also include one or more tags used to retrieve an interactive display element 214 from a remote location (e.g., the analytics server, the content source that provides webpage 206, etc.) and to display the interactive display element 214 on display 200.

A website may include a number of different webpages. In some cases, a website will have one or more "goals," which may be webpages that are reached when a visitor to the website performs an action that the website seeks to encourage or otherwise defines as a goal. Generally speaking, this means that the visitor to the website does something that serves the interests of the organization that owns the website. For example, an e-commerce website may have one or more goal webpages that are reached when a sale is completed. Such webpages often simply display a message thanking the customer for the business and indicating that the transaction was completed successfully. In the case of a website belonging to a social organization, on the other hand, a goal may include providing personal information, such as email and mailing addresses and phone numbers, and signing up to receive communications from the organization. In such a case also, a goal webpage may provide a confirmation to the visitor that the information was received, and customary message of thanks.

When a visitor to a website navigates to a goal webpage, this may be referred to as a "conversion." However, not every visitor to a website will result in a conversion. For example, not every visitor to an e-commerce website will buy something or otherwise meet a criterion predefined to represent a conversion. There are various reasons for this. Some visitors may come to the website to browse, and decide that the prices are too high. Other visitors may not find the products they are seeking. Still other visitors may simply be browsing or may have reached the website by mistake.

Some visits, however, will fail to result in a conversion at least in part because of a flaw in the design of the website. When a flaw in the design of a webpage at the website results in a failed conversion, the organization that owns the website suffers a lost opportunity—lost customers, lost money, fewer members of a mailing list, etc.

The design of a webpage generally includes a number of display elements, such as a background, images, text, buttons, links, forms, embedded content, and so on. Changes in the organization and presentation of these elements can have measurable effects on conversion rates. For example, one way in which a conversion commonly is reached is through a "call-to-action"—a message to the visitor to "click here now!" or "press this button to checkout." Often a call-to-action is implemented as a button, although other implementations are possible, such as links, forms, or any other display element that is interactive.

Various inefficiencies in display elements, such as calls-to-action, may reduce conversion rates. In some cases, elements may be implemented in inefficient sizes. In FIG. 2, for example, interactive display element 214 may be a call-to-action seeking a conversion by convincing a visitor to the webpage to click on the element 214, and thus being presented information about how to "Buy a new car now!" In this simplified example, two different elements are presented on the webpage, namely interactive display element 214 and a movie element 216. The movie element 216 is significantly larger than the interactive display element 214, and thus the movie will likely grab the attention of a visitor to the web page better than the smaller interactive display element 214.

In some cases, inefficiencies in display elements may affect conversion rates, even if the display elements themselves are not clickable. For example, a movie or graphic may not be clickable (i.e., it is not an interactive display element), but may nevertheless be distracting, especially if the subject matter presented in the movie or graphic is not relevant to the theme of the website as a whole. In some implementations, display elements may be analyzed in the context of the content of the website to determine a metric of relevance to the website, which can be used in determination of both potential increases in conversion/progression rates associated with modification (often, removal) of the display element, and in determination of whether to implement such a modification. For example, two modifications to display elements may have equivalent expected improvements in conversion rates, but one element may include a highly relevant advertisement that also is beneficial to the website, while another element may include an advertisement that is not as relevant and has less associated value. In such an example, the less relevant advertisement may be the one that should be removed.

Figure 3:
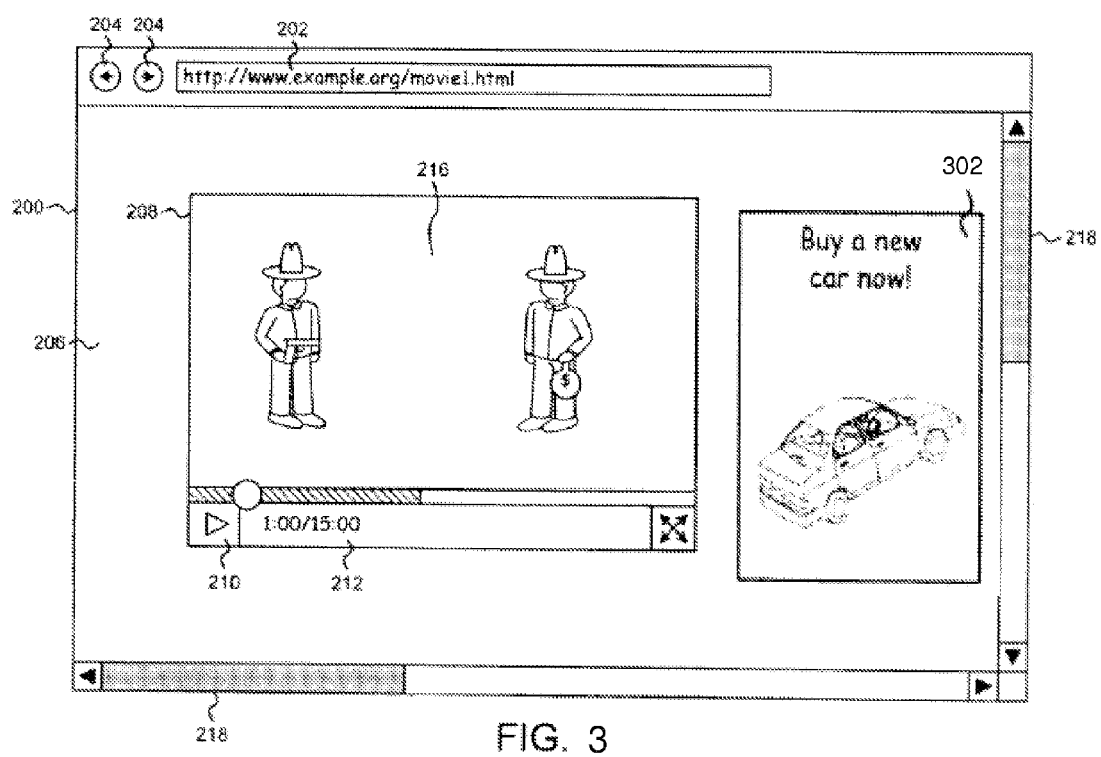
FIG. 3 is a diagram of the web page of FIG. 2, in which a display element has been changed to change a size of the display element.

FIG. 3 is a diagram of the web page of FIG. 2, in which the interactive display element 214 has been replaced with a larger interactive display element 302. The size and prominence of the interactive display element 302 relative to the movie element 216 is now increased, and the likelihood that visitors to the web page will be distracted by the movie, and perhaps fail to notice or forget about buying a car, is similarly reduced.

Figure 4:
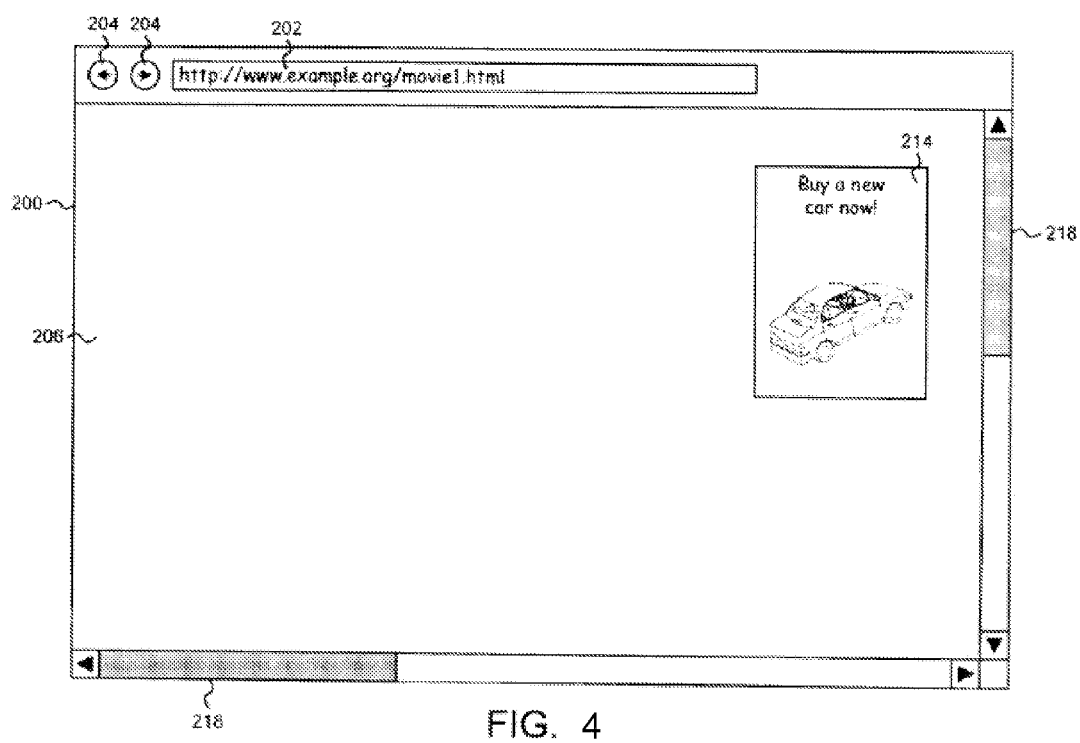
FIG. 4 is a diagram of the web page of FIG. 2, in which a display element has been removed.

FIG. 4 is a diagram of the web page of FIG. 2, in which the movie element 216 has been removed. By removing the movie element 216 altogether, visitors to the web page are prevented from being distracted by the movie, as it is no longer present. By removing display elements such as movie element 216, the system also may remove links and other such interactive display elements navigating away from the web page to web pages not in the desired traffic pattern, such as a traffic pattern or flow leading to a conversion.

Figure 5A:
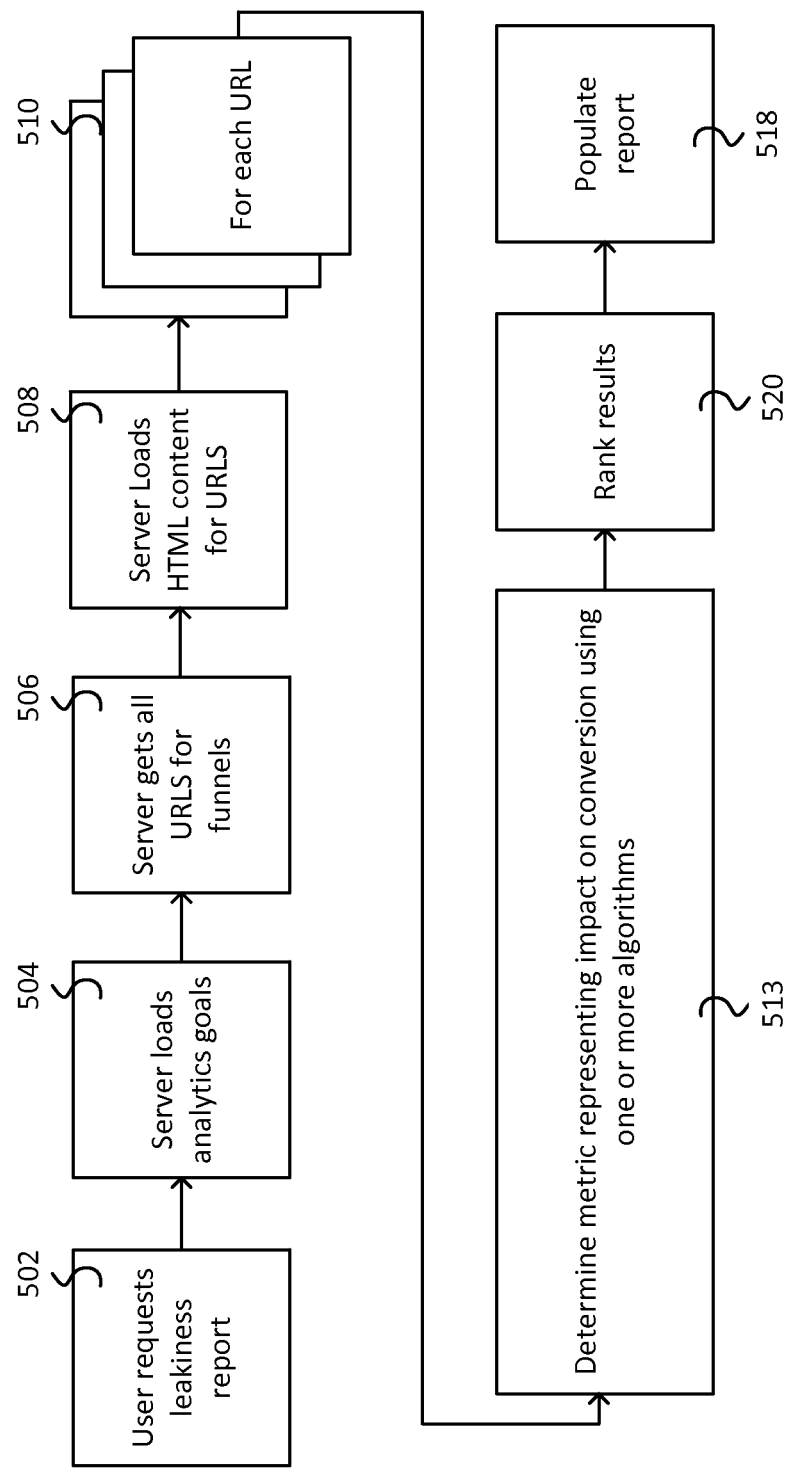
FIGS. 5A and 5B are flow diagrams of a process in accordance with a described implementation.

A process in accordance with a described implementation is now described with reference to FIGS. 5A and 5B. The process begins at block 502, where a user requests a report regarding retention of website visitors within the traffic pattern (which may be referred to a "leakiness report," reporting how visitors are "leaking" from a desired traffic pattern). The request may be sent to and processed by the analytics server 104 in FIG. 1. The process continues at block 504, where the analytics server loads information on goals of the website. This information includes at least one goal webpage of the website to which the user hopes to drive as many visits as possible. Such goals often include landing pages that are loaded to confirm completion of a transaction such as a sale on an e-commerce website, or a "thank you" page in response to a visitor to the web page providing personal information, joining a mailing list, providing a charitable pledge, etc. The analytics server can use the information on these goals to analyze at least one traffic pattern of the website.

The process continues at block 506, where the analytics server retrieves URLs corresponding to a plurality of web pages corresponding to nodes in a traffic pattern to be analyzed. A traffic pattern of a website sometimes may be referred to as a "funnel," in recognition of the patterns with which visitors to the website pass through the traffic pattern. A traffic pattern in an e-commerce website may progress from a web page where a visitor to the website selects goods to purchase, through the traffic pattern to a web page where the visitor provides billing and delivery information, and onward to a final checkout web page followed by a web page providing a confirmation that the transaction was completed successfully. Each page in this example traffic pattern only can be reached by passing through the traffic pattern in order. For example, one generally will not reach the page confirming a successful transaction without first finalizing the transaction on the appropriate web page. Similarly, one generally will not reach a page for finalizing a transaction without first having selected goods to purchase. While in this example, the allowable sequence through the nodes of the traffic pattern towards the goal may not include skipping forward over intermediate nodes, other traffic patterns also are possible, wherein a visitor may navigate more freely, and the example is not meant to be limiting.

Figure 7:
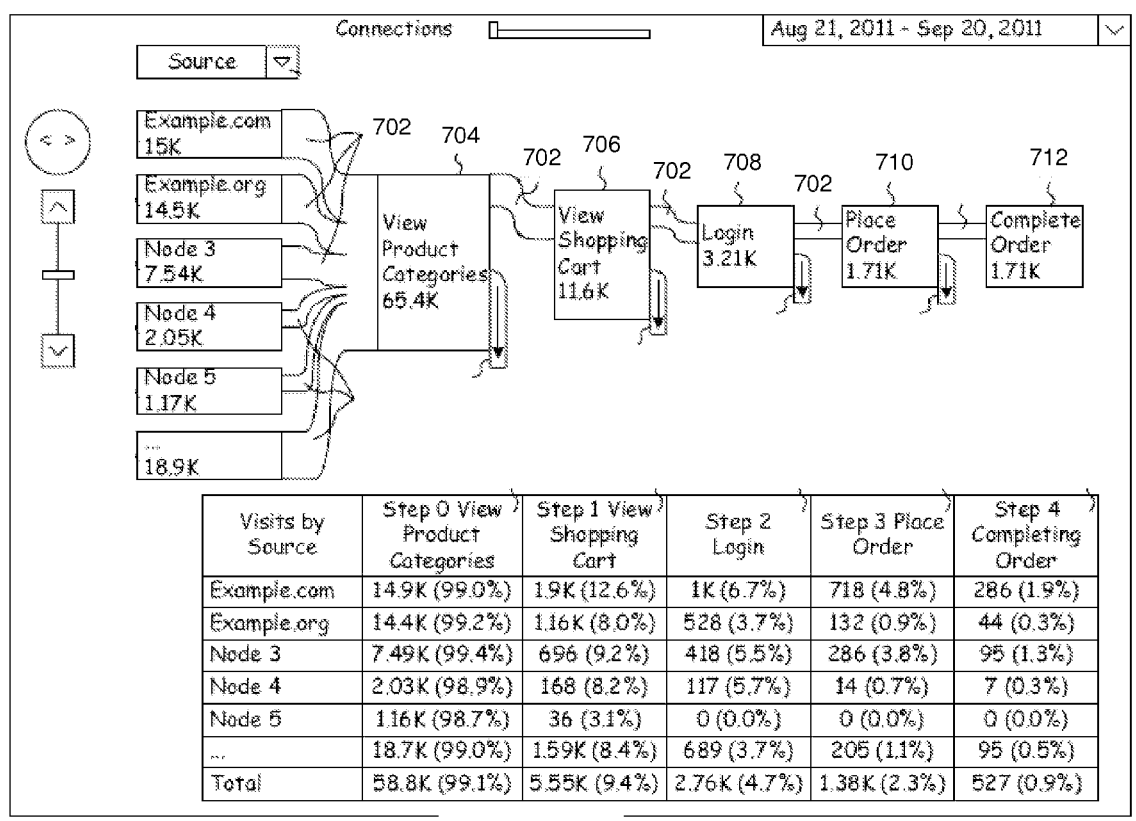
FIG. 7 is a block diagram illustrating a traffic pattern and associated nodes of a website.

As a particular example, FIG. 7 illustrates a traffic pattern of nodes through a website. A visitor to the website may navigate from various nodes to node 704 in the traffic pattern by links 702. At node 704, the visitor to the website may view categories of products that may be selected for purchase. In this example, we may have observed 65.4 thousand visitors who reached this node in the traffic pattern over a certain period of time. Visitors may then navigate via links 702 to node 706, where the visitor may view the visitor's shopping cart. At this point, only 11.6 thousand visitors may have reached this node, with the remaining visitors to node 704 having navigated away from the traffic pattern (or perhaps simply turned off the computer). In this example, completing a purchase requires logging in to an account, and the visitors to node 706 may then navigate via links 702 to node 708, where the visitor is prompted to log in. More visitors have now been lost, and only 3.21 thousand remain. Visitors may then log in and follow links 702 to node 710. At node 710, the visitors are prompted to place the order, and now only 1.71 thousand visitors remain. In the present example, essentially all of the 1.71 thousand visitors to node 710 successfully complete an order and reach node 712, where they see a confirmation that the order was completed. Node 712 is a goal node in this example, and reaching node 712 is a conversion.

Visitors to the various web pages in the example traffic pattern just described may "leak" at each stage; i.e., the visitor fails to progress from one web page to the next web page in the predetermined or desired traffic pattern. This may occur for a variety of reasons, as discussed earlier in relation to FIGS. 2-4. Accordingly, the number of visitors who reach nodes in a traffic pattern may tend to be monotonically decreasing between the early nodes in the traffic pattern and the later nodes in the traffic pattern. Such a pattern is evocative of a funnel-shape, in that the number of visitors, like the sides of a funnel, shrink toward a final number of visitors who reach a goal node, similarly to how liquid in a funnel travels toward a small, central conduit.

The process continues at block 508, where the analytics server retrieves the contents of the web pages corresponding to the URLs retrieved at block 506. The process continues at block 510, where the analytics server begins a subprocess. In the process shown in FIG. 5A, at block 513 the analytics server calculates a relevant percentage/ratio using one or more algorithms. As shown in FIG. 5B, one implementation of block 513 from FIG. 5A is shown including blocks 512, 514, 516, 520 and 518, which are executed separately for each of the URLs. Other techniques for analyzing web pages and determining candidate modifications to the web pages also may be employed, such as those discussed above in relation with FIGS. 2-4.

Figure 5B:
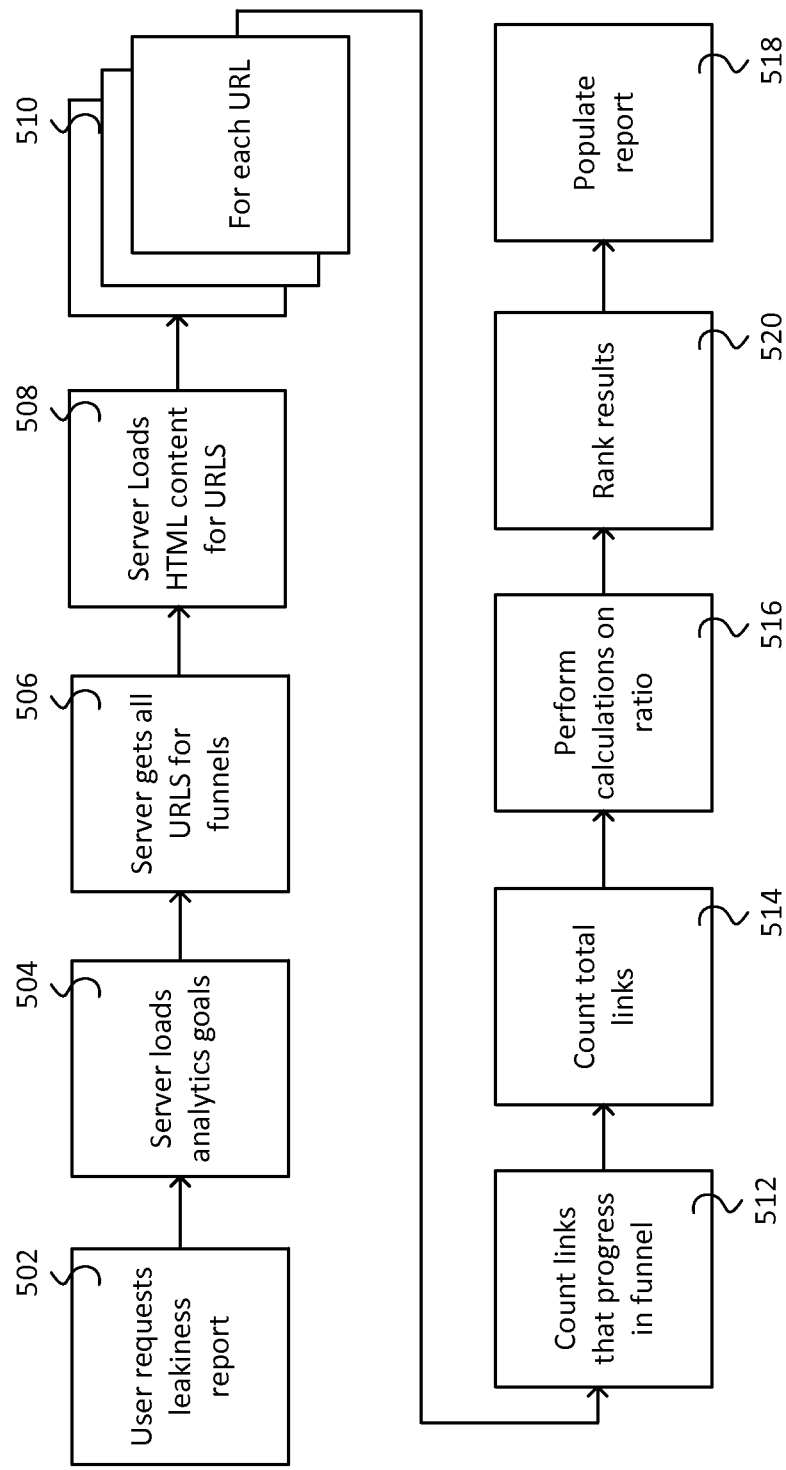

The subprocess of FIG. 5B begins at block 512, where the analytics server determines which of the links contained in the content corresponding to the URL being analyzed progress to a web page associated with a subsequent node in the traffic pattern, and determines how many such links are found on the web page. At block 514, the analytics server determines a total number of links at the web page, and at block 516, the analytics server determines a ratio representing a percentage of the links at the web page that lead to a web page associated with a subsequent node in the traffic pattern. One ranking algorithm that may be used in combination with these blocks is as follows: a ratio is calculated representing the number of links that may be removed from a web page to the number of links on the web page. This ratio is combined with (e.g., by direct multiplication) a conversion rate, revenue values, and a scaling factor, which may be determined algorithmically, experimentally, or by designation by a user. A minimum number of nodes in a traffic pattern also may be used in calculating a ratio relative to the value determined above. The result is a dollar impact score then may then be ranked relative to other dollar impact scores in determining a course of action, as is described further below.

The subprocess of determining a ratio of links, just described with reference to blocks 512, 514 and 516, is only exemplary, and is not meant to be limiting. Other subprocesses also may be employed to achieve similar results, wherein the analytics server determines information relating to the tendency of visitors to progress through the traffic pattern from the web page under consideration. The approach just described may be effective because when a large number of links are available at a web page, and few of those links progress through the traffic pattern, it may be more likely that a visitor to that web page may navigate out of the traffic pattern by following one of the links that lead away from the traffic pattern. Other approaches include, e.g., analyzing potential modifications to display elements, such as was discussed above in relation to FIGS. 2-4.

Generally speaking, the analytics server may develop a metric for the web page relating to an impact on a conversion rate, a progression rate, etc., such as at least one of a current efficiency in delivering visitors to the web page to a subsequent web page associated with a node in the traffic pattern, and a potential improvement in efficiency in delivering visitors to such a web page. Such metrics may be provided according to various techniques. For example, links and other interactive display elements may be observed in action as implemented in various websites and analytics data may be collected regarding, inter alia, progression rates and/or conversion rates (rates of reaching a goal node) realized with the various interactive display elements. Algorithms also may be provided that use, e.g., rules-based analysis. The rules may themselves be based on empirical study. For example, an expected difference between using blue text or black text on a white background may be an X % difference in a progression rate (or a conversion rate), (where X is the value that has been established by empirical study), while white text on a white background may be observed to result in a different value (likely a near zero percent progression rate).

Attrition of visitors from a traffic pattern can be predicted using other techniques, as well. For example, removing links may have effects on visitor reaction to the web page in ways other than changing which interactive elements with which the visitor clicks or otherwise interacts. Removing links also may reduce distraction or potential to alienate users. An age-inappropriate advertisement, for example, may result, not in a click on a link, but a browser window close. According to another technique, a percentage of the screen that is occupied by the links may be used as a metric. If a link takes up a lot of space, removing it may have more impact than removing a more spatially compact link. A distance between a link and a call-to-action also may be relevant, in that the closer a link is located on the screen to the call-to-action, generally the more likely the link is to distract the visitor from the call-to-action. Yet other differentiating features include a contrast or color analysis (e.g., if the color of a link is a poor contrast with the background, making it hard to see, it is less likely to be clicked), a font analysis (using a different font in a call-to-action may help set it apart and stand out, while if the font size of a link is smaller than the surrounding text or other links, the link in question may be less prominent and less likely to be clicked). The factor listed above also may be considered in combination by appropriate weighting schemes, or as multiple inputs to an evaluation algorithm.

The subprocess continues at block 520, where results of the analysis may be ranked (and weighted or sorted) and the analytics server may provide a report of the findings resulting from the preceding blocks at block 518. Such a report may include a ratio of progressing links to non-progressing links, one or more candidate modifications to display elements, such as specific links that may be removed from the web page or a number of links that should be removed from the page, estimated improvements in a rate of progression through the traffic pattern from the web page or a conversion rate, etc. The analytics server also may provide one or more suggested courses of action in an ordered list.

For example, one course of action may include removing an irrelevant advertisement. If a visitor is about to complete a transaction booking an airplane flight to London, an advertisement for a hotel in London would likely be irrelevant and a distraction to the visitor. A selected course of action might be to remove the advertisement. In another example, a flashing advertisement that leads away from the traffic pattern might be situated directly next to a button for completing a transaction. The advertisement may be distracting because of its close proximity to the checkout button. In such a case, a selected course of action might be to move the advertisement to a new location, further away from the checkout button, rather than removing it altogether.

The courses of action may be ranked according to one of the weighting metrics discusses above. In some implementations, the analytics server also may receive a user input selecting a course of action. In other implementations, the analytics server also may automatically select a course of action based on one or more metrics. Also in some implementations, the analytics server may generate new computer code implementing a selected course of action and provide the computer code to one or more content servers that provide content for the website, and implement the selected course of action.

The report may include additional information, such as, a breakdown of attrition/progression rates through the traffic pattern by node, allowing an administrator to review the report and see which nodes have the worst attrition, which have the best, etc. Attrition rates may include absolute rates, i.e., what number of visitors fail to progress past a certain node, or relative, i.e., what percentage of visitors fail to progress past a certain node. Report output may be held in a cache to avoid requiring on-demand computational resources. Reports also may be generated as a background process and emailed to an administrator on a schedule.

According to some implementations, the analytics server may generate the computer code for implementing each of the candidate courses of action, allowing a user to download any of the generated code as chosen. According to other implementations, the analytics server may receive the selection input from the user indicating which of the courses of action is to be implemented, and may only then generate the computer code to implement the selected course of action. In some implementations, the candidate courses of action may be provided with the metric information, while in other implementations such information may be hidden from the user. If there are large differences between the expected results of the different courses of action it may be beneficial for the user to have this knowledge. On the other hand, if the expected differences are relatively minor and speculative (because, e.g., the expected conversion rates are predictions but are not certain to be realized), it may be more useful to provide the list without distracting the user with the metric information that was used to generate the list. In such an implementation, the user would be able to decide based on aesthetics, intuition, and other qualitative factors which approach to take. Once the code has been downloaded and used to implement the modified web page, the website can begin to present visitors to the updated webpage(s) the new version of the webpage.

Figure 6:
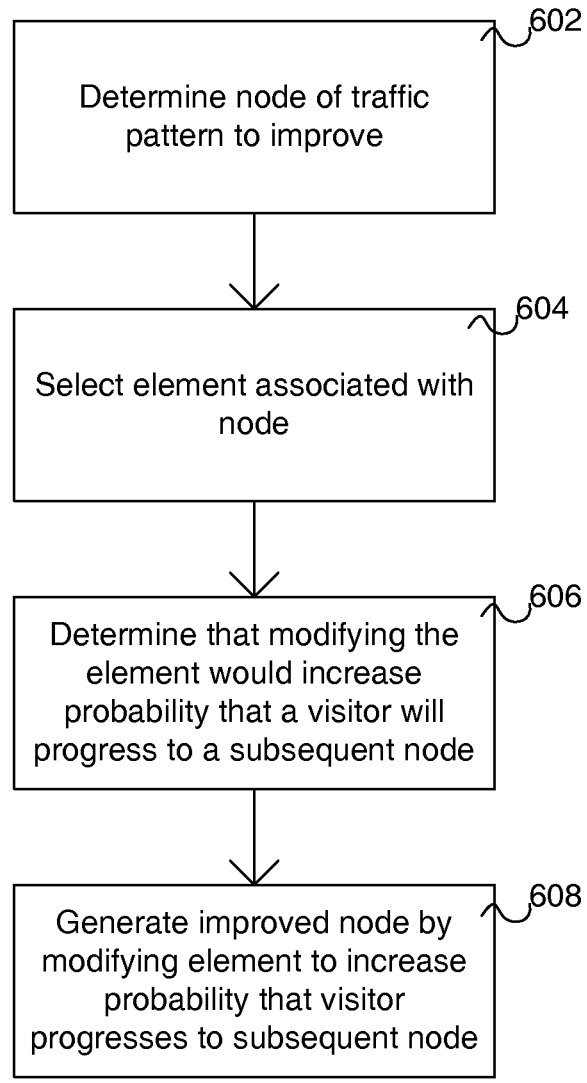
FIG. 6 is a flow diagram of a process in accordance with a described implementation.

Similarly to FIG. 5, FIG. 6 is a flow diagram of a process in accordance with a described implementation. The process begins at block 602, at which the analytics server determines a node of a traffic pattern to improve. The process continues at block 604, where the analytics server selects an element associated with the node. The process continues at block 606, where the analytics server determines that modifying the element would increase the probability that a visitor to the web page associated with the node will progress to a subsequent node in the traffic pattern. The process continues at block 608, where the analytics server generates an improved web page associated with the node by modifying the element to increase the probability that the visitor progresses to a subsequent node. Other implementations may not be limited to web pages, and other traffic patterns with nodes are contemplated. For example, a rich media application may provide a series of user interfaces according to a traffic pattern, with each node of the traffic pattern having an associated user interface. User interfaces that operate according to such traffic patterns also may include, e.g., automated kiosks where users may purchase train tickets, movie tickets, exchange currency, etc.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus or processing circuit on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of improving a traffic pattern through web page nodes of a website, the method comprising:
  receiving, at a processor, the traffic pattern, the traffic pattern including a plurality of web page nodes and a goal web page node, the traffic pattern including a predetermined sequence beginning with a first web page node of the plurality of web page nodes and ending with the goal web page node,
    wherein each web page node of the plurality of web page nodes is associated with a first web page having a link to a second web page, wherein the second web page is associated with a web page node of the plurality of web page nodes of the traffic pattern that is subsequent to the web page node associated with the first web page in the predetermined sequence;
  for each web page node of the plurality of web page nodes:
    receiving, at the processor, data indicative of a web page associated with the each web page node,
    identifying, using the processor, a display element of the web page associated with the each web page node that is associated with a decreased probability that the user progresses from the web page associated with the each web page node to a subsequent web page associated with a subsequent web page node according to the predetermined sequence of the traffic pattern, and
    determining, using the processor, a metric for the each web page node representing an impact on a conversion attributable to the display element, wherein the conversion is associated with the goal web page node;
  ranking, using the processor, the plurality of web page nodes based on the determined metric for each web page node;
  storing, in a non-transitory computer-readable medium, information about the ranking;
  selecting a web page node of the plurality of web page nodes of the traffic pattern to improve; and
  modifying a display element of a web page associated with the selected web page node to increase a probability that a visitor to the web page node will progress to the subsequent web page node of the traffic pattern.

2. The method according to claim 1, wherein identifying the display element is performed based on an expected change in a conversion rate of the traffic pattern associated with modifying the display element, wherein the expected conversion rate represents a probability that a visitor to the web page node will progress to the goal web page node of the traffic pattern.

3. The method according to claim 1, wherein the selecting a web page node of the plurality of web page nodes of the traffic pattern to improve is based on the determined metric, wherein the determined metric is a ratio of a first number of links that navigate out of the traffic pattern to a second number of links that progress through the traffic pattern according to the predetermined sequence.

4. The method according to claim 1, wherein the selecting a web page node of the plurality of web page nodes of the traffic pattern to improve is based on the determined metric, wherein the determined metric is representative of an amount of content on a web page associated with the web page node that is relevant to the goal web page node of the traffic pattern.

5. The method according to claim 1, wherein the selecting a web page node of the plurality of web page nodes of the traffic pattern to improve is based on the determined metric, wherein the determined metric is an expected dollar impact associated with increasing a probability that a visitor to the web page node will progress to a subsequent web page node of the traffic pattern.

6. The method according to claim 1, wherein the selecting a web page node of the plurality of web page nodes of the traffic pattern to improve is based on the determined metric, wherein the determined metric is based, at least in part, on empirically observed data relating to percentages of visitors to the plurality of web page nodes of the traffic pattern who progress through the traffic pattern to a subsequent web page node of the traffic pattern.

7. The method according to claim 1, wherein the selecting a web page node of the plurality of web page nodes of the traffic pattern to improve is based on the determined metric, wherein the determined metric is a percentage of space on a web page associated with the web page node that is associated with content that is relevant to the goal web page node of the traffic pattern.

8. A non-transitory computer-readable medium, having machine instructions stored therein, the instructions being executable by one or more processors to cause the one or more processors to perform operations comprising:
  receiving a traffic pattern, the traffic pattern including a plurality of web page nodes and a goal web page node, the traffic pattern including a predetermined sequence beginning with a first web page node of the plurality of web page nodes and ending with the goal web page node,
    wherein each web page node of the plurality of web page nodes is associated with a first web page having a link to a second web page, wherein the second web page is associated with a web page node of the plurality of web page nodes of the traffic pattern that is subsequent to the web page node associated with the first web page in the predetermined sequence;
  for each web page node of the plurality of web page nodes:
    receiving data indicative of a web page associated with the each web page node,
    determining a first number of display elements of the web page that link to a subsequent web page associated with a subsequent web page node according to the predetermined sequence of the traffic pattern,
    determining a total number of display elements of the web page that link to other web pages,
    determining a ratio of the first number of display elements to the total number of display elements,
    identifying a display element of the web page associated with the each web page node that is associated with a decreased probability that the user progresses from the web page associated with the each web page node to a subsequent web page associated with a subsequent web page node according to the predetermined sequence of the traffic pattern;
    determining a metric for the each web page node representing an impact on a conversion attributable to the display element and based, at least in part, on the determined ratio, wherein the conversion is associated with the goal web page node;
  ranking the plurality of web page nodes based on the determined metric for each web page node;
  storing information about the ranking;
  selecting a web page node of the plurality of web page nodes of the traffic pattern to improve; and
  modifying a display element of the web page associated with the web page node to increase a probability that a visitor to the web page node will progress to a subsequent web page node of the traffic pattern.

9. The non-transitory computer-readable medium according to claim 8, wherein identifying the display element is further performed based on an expected change in a conversion rate of the traffic pattern associated with modifying the display element, wherein the expected conversion rate represents a probability that a visitor to the web page node will progress to the goal web page node of the traffic pattern.

10. The non-transitory computer-readable medium according to claim 8, wherein selecting a web page node of the plurality of web page nodes of the traffic pattern to improve is based on the determined ratio.

11. The non-transitory computer-readable medium according to claim 8, wherein selecting a web page node of the plurality of web page nodes of the traffic pattern to improve is based on the determined metric, wherein the determined metric is representative of an amount of content on a web page associated with the web page node is relevant to the goal web page node of the traffic pattern.

12. The non-transitory computer-readable medium according to claim 8, wherein selecting a web page node of the plurality of web page nodes of the traffic pattern to improve is based on the determined metric, wherein the determined metric is an expected dollar impact associated with increasing a probability that a visitor to the web page node will progress to a subsequent web page node of the traffic pattern.

13. The non-transitory computer-readable medium according to claim 8, wherein selecting a web page node of the plurality of web page nodes of the traffic pattern to improve is based on the determined metric, wherein the determined metric is based, at least in part, on empirically observed data relating to percentages of visitors to the plurality of web page nodes of the traffic pattern who progress through the traffic pattern to a subsequent web page node of the traffic pattern.

14. The non-transitory computer-readable medium according to claim 8, wherein selecting a web page node of the plurality of web page nodes of the traffic pattern to improve is based on the determined metric, wherein the determined metric is a percentage of space on a web page associated with the web page node that is associated with content that is relevant to the goal web page node of the traffic pattern.

15. A system for improving a traffic pattern through web page nodes of a website, the system comprising:
  a processor;
  a memory; and
  a communication interface, in communication with the memory and configured to transmit data between the memory and the processor, wherein the processor is configured to process instructions to:
    receive the traffic pattern, the traffic pattern including a plurality of web page nodes and a goal web page node, the traffic pattern including a predetermined sequence beginning with a first web page node of the plurality of web page nodes and ending with the goal web page node,
  wherein each web page node of the plurality of web page nodes is associated with a first web page having a link to a second web page, wherein the second web page is associated with a web page node of the plurality of web page nodes of the traffic pattern that is subsequent to the web page node associated with the first web page in the predetermined sequence,
for each web page node of the plurality of web page nodes:
  receive data indicative of a web page associated with the each web page node,
  identify a display element of the web page associated with the each web page node that is associated with a decreased probability that the user progresses from the web page associated with the each web page node to a subsequent web page associated with a subsequent web page node according to the predetermined sequence of the traffic pattern, and
  determine a metric for the each web page node representing an impact on a conversion attributable to the display element, wherein the conversion is associated with the goal web page node,
rank the plurality of web page nodes based on the determined metric for each web page node,
select a web page node of the plurality of web page nodes of the traffic pattern to improve based on the ranking of the plurality of web page nodes, and
modify a display element of a web page associated with the selected web page node to increase a probability that a visitor to the web page node will progress to the subsequent web page node of the traffic pattern.

16. The system according to claim 15, wherein identifying the display element is performed based on an expected change in a conversion rate of the traffic pattern associated with modifying the display element, wherein the expected conversion rate represents a probability that a visitor to the web page node will progress to the goal web page node of the traffic pattern.

17. The system according to claim 15, wherein the determined metric is a ratio of a first number of links that navigate out of the traffic pattern to a second number of links that progress through the traffic pattern according to the predetermined sequence.

18. The system according to claim 15, wherein the determined metric is representative of an amount of content a web page associated with the web page node is relevant to the goal web page node of the traffic pattern.

19. The system according to claim 15, wherein the determined metric is an expected dollar impact associated with increasing a probability that a visitor to the web page node will progress to a subsequent web page node of the traffic pattern.

20. The system according to claim 15, wherein the determined metric is based, at least in part, on empirically observed data relating to percentages of visitors to the plurality of web page nodes of the traffic pattern who progress through the traffic pattern to a subsequent web page node of the traffic pattern.

21. The system according to claim 15, wherein the determined metric a percentage of space on a web page associated with the web page node that is associated with content that is relevant to the goal web page node of the traffic pattern.

\* \* \* \* \*